(12) United States Patent
Kim

(10) Patent No.: US 7,779,443 B2
(45) Date of Patent: Aug. 17, 2010

(54) WIRELESS COMMUNICATION SYSTEM AND METHOD USING A WIRELESS CHANNEL

(75) Inventor: Kun-tae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1335 days.

(21) Appl. No.: 11/143,485

(22) Filed: Jun. 3, 2005

(65) Prior Publication Data

US 2005/0283809 A1    Dec. 22, 2005

(30) Foreign Application Priority Data

Jun. 21, 2004    (KR) .................... 10-2004-0046213

(51) Int. Cl.
*H04N 7/18* (2006.01)
(52) U.S. Cl. ........................ 725/81; 375/240
(58) Field of Classification Search .............. 725/81, 725/78; 375/240
See application file for complete search history.

(56) References Cited

U.S. PATENT DOCUMENTS

| 2003/0097662 | A1* | 5/2003 | Russ et al. .................. 725/117 |
| 2005/0074061 | A1* | 4/2005 | Ribas-Corbera et al. .................. 375/240.01 |
| 2005/0207501 | A1* | 9/2005 | Auyeung ............... 375/240.26 |
| 2006/0233201 | A1* | 10/2006 | Wiesenthal ................. 370/477 |
| 2007/0025446 | A1* | 2/2007 | Matsumoto et al. .... 375/240.21 |

FOREIGN PATENT DOCUMENTS

| JP | 2000-69476 | | 3/2000 |
| KR | 2000-74005 | A | 12/2000 |
| KR | 2001-54171 | A | 7/2001 |
| KR | 2002-37455 | A | 5/2002 |

* cited by examiner

*Primary Examiner*—Joseph P Hirl
*Assistant Examiner*—Jivka Rabovianski
(74) *Attorney, Agent, or Firm*—Stanzione & Kim, LLP

(57) ABSTRACT

Wireless communication system and wireless communication method using a wireless channel. A transmitting device changes one of a data bitrate of a video signal and an actual transmission rate of the video signal based on a determination of a maximum transmission throughput of the wireless channel and transmits the video signal over the wireless channel according to the change in the data bitrate or the change in the actual transmission rate. A receiving device receives, temporarily stores, and decodes the video signal transmitted over the wireless channel. Thus, the wireless communication system is capable of maintaining a continuous video display when a discontinuous video signal is transmitted over the wireless channel.

25 Claims, 4 Drawing Sheets

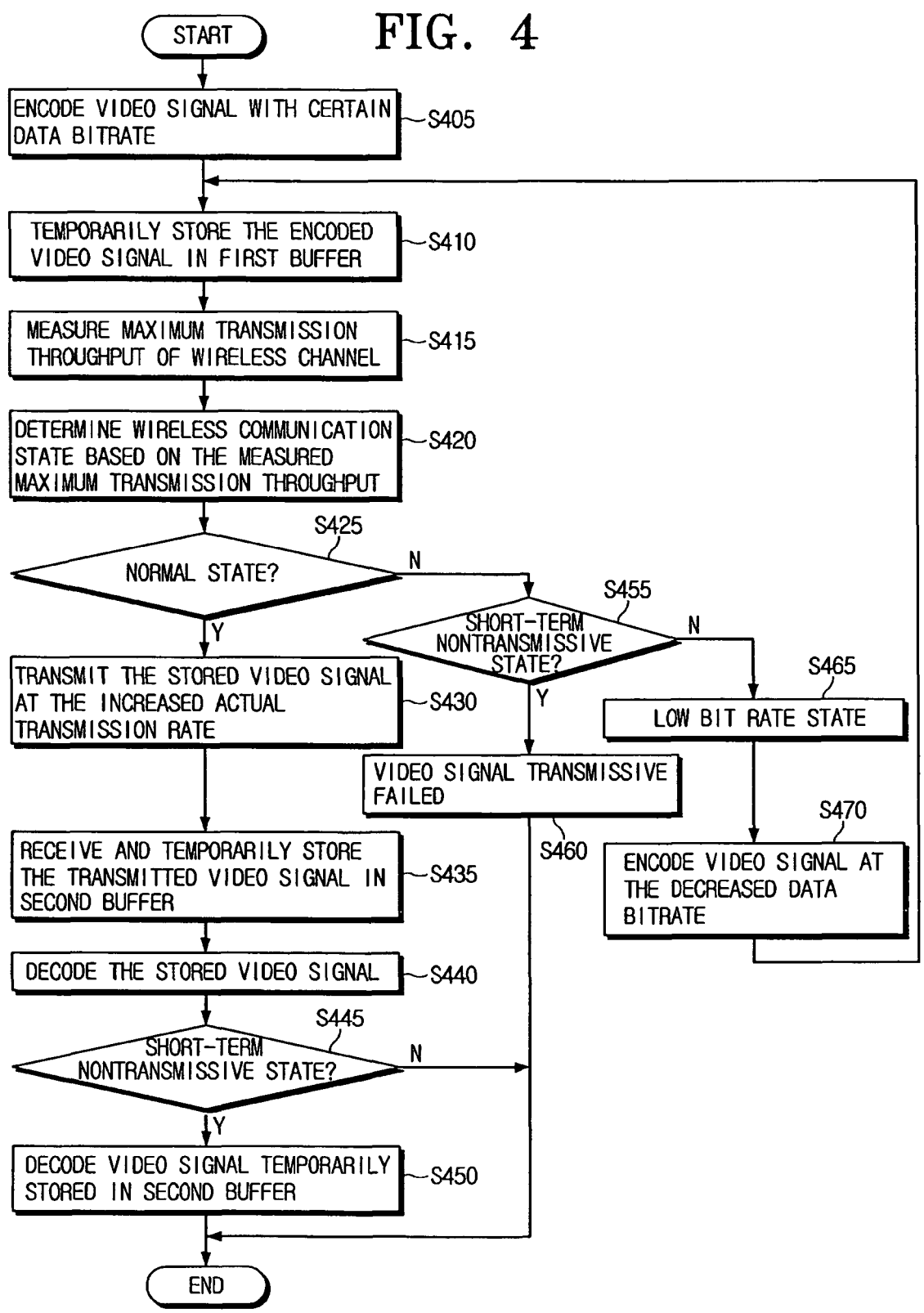

WIRELESS COMMUNICATION SYSTEM AND METHOD USING A WIRELESS CHANNEL

CROSS-REFERENCE TO RELATED APPLICATIONS

This application claims the benefit under 35 U.S.C. §119(a) from Korean Patent Application No. 2004-46213 filed on Jun. 21, 2004 in the Korean Intellectual Property Office, the entire disclosure of which is incorporated herein by reference.

BACKGROUND OF THE INVENTION

1. Field of the Invention

The present general inventive concept relates generally to a wireless communication system and a method using a wireless channel. More particularly, the present general inventive concept relates to a wireless communication system and a method using a wireless channel, which enables a video signal transferred over the wireless channel to be continuously displayed on a screen display.

2. Description of the Related Art

A wireless communication system for transferring a video signal through a wireless channel includes a transmitter and a receiver. The transmitter transmits the video signal incoming from outside to the receiver over the wireless channel. The receiver processes the video signal and displays the video signal received over the wireless channel.

By way of example, the transmitter may be a set-top box to receive a video signal from a video source, and the receiver may be a digital television to receive and digitize the video signal. The wireless communication system is able to facilely provide the video signal to a viewer without the use of additional equipment such as a cable to connect the transmitter to the receiver.

However, a conventional wireless communication system using the wireless channel, unlike a cable channel, is affected by an external environment. A conventional digital broadcast system cannot transfer the video signal across the wireless channel if the external environment becomes negatively effected. For instance, in the event that poor weather causes lightning and thunder, the transmission of the video signal over the wireless channel is temporarily suspended, and the video signal displayed on the receiver also freezes. As a result, the viewer perceives a discontinuity in the displayed video signal.

SUMMARY OF THE INVENTION

The present general inventive concept provides a wireless communication system capable of maintaining a continuous video display when a discontinuous video signal is transmitted over a wireless channel, and a method thereof.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a wireless communication system using a wireless channel that comprises a transmitting device to change either a data bitrate of a video signal or an actual transmission rate of the video signal according to a determination of a maximum transmission throughput of the wireless channel and to transmit the video signal over the wireless channel according to the change in the data bitrate and/or the change in the actual transmission rate, and a receiving device to receive, temporarily store, and decode the video signal transmitted over the wireless channel.

The transmitting device may further comprise an encoder to encode the video signal according to the data bitrate, a first buffer to temporarily store the encoded video signal, a wireless transmitter to check the maximum transmission throughput which varies according to an external environment and to transmit the temporarily stored video signal to the receiving device over the wireless channel, and a first controller to determine a wireless communication state based on the checked maximum transmission throughput and to control the encoder or the wireless transmitter to change the data bitrate or the actual transmission rate, respectively, according to the determination.

The first controller may control the wireless transmitter to transmit the video signal to the receiving device by increasing the actual transmission rate of the video signal temporarily stored in the first buffer if the wireless communication state is determined to be a normal state.

The first controller may control the wireless transmitter to transmit the video signal by increasing the actual transmission rate to a maximum value of the maximum transmission throughput.

The first controller may determine that the wireless communication state is the normal state if the maximum transmission throughput is greater than a maximum value of the actual transmission rate by a predetermined value.

The first controller may control the encoder to decrease the data bitrate of the video signal when the wireless communication state is determined to be a low bit rate state in which the maximum transmission throughput is less than a predetermined threshold.

The predetermined threshold may comprise the maximum value of the actual transmission rate.

The receiving device may comprise a wireless receiver to receive the video signal transmitted from the transmitting device, a second buffer to temporarily store the received video signal, a decoder to decode the stored video signal, and a second controller to control the wireless receiver and the second buffer to temporarily store the received video signal in the second buffer.

The second controller may control the wireless receiver and the second buffer to temporarily store the video signal being transmitted at the increased actual transmission rate in the normal state in the second buffer while available storage capacity of the second buffer decreases.

The second controller may control the wireless receiver to read the video signal from the second buffer having the decreased available storage capacity and provide the read video signal to the decoder if the wireless communication state is determined to be a short-term nontransmissive state.

The second controller may determine that the wireless communication state is the short-term nontransmissive state if the wireless receiver does not receive the video signal over a predetermined time.

The transmitting device may comprise a set-top box receiving the video signal from a video source, and the receiving device may comprise a television reproducing the video signal received from the transmitting device.

The foregoing and/or other aspects and advantages of the present general inventive concept are also achieved by providing, a wireless communication method using a wireless channel, the method comprising: changing one of a data bitrate of a video signal and an actual transmission rate of the video signal according to a determination of a maximum transmission throughput of the wireless channel and transmitting the video signal over the wireless channel according to the change in the bitrate or the change in the actual transmission rate, and receiving, temporarily storing, and decoding the video signal transmitted over the wireless channel.

The transmitting of the video signal over the wireless channel may comprise encoding the video signal according to the data bitrate, temporarily storing the encoded video signal in a first buffer, measuring the maximum transmission throughput, which varies according to an external environment, determining a wireless communication state based on the measured maximum transmission throughput, and transmitting the video signal by increasing the actual transmission rate of the video signal temporarily stored in the first buffer if the wireless communication state is determined to be a normal state.

The transmitting of the video signal by increasing the actual transmission rate may comprise transmitting the video signal to the receiving device by increasing the actual transmission rate of the video signal to a maximum value of the maximum transmission throughput if the wireless communication state is determined to be the normal state.

The determining of the wireless communication state may comprise determining that the wireless communication state is the normal state if the maximum transmission throughput is greater than a maximum value of the actual transmission rate by a predetermined value.

The encoding of the video signal may comprise decreasing the data bitrate of the video signal when the wireless communication state is determined to be a low bit rate state in which the maximum transmission throughput is less than a predetermined threshold.

The predetermined threshold may comprise the maximum value of the actual transmission rate.

The receiving of the video signal may comprise receiving the transmitted video signal, temporarily storing the received video signal in a second buffer, and decoding the video signal temporarily stored in the second buffer.

The temporary storing of the received video signal in the second buffer may comprise temporarily storing the video signal being transmitted at the increased actual transmission rate in the normal state in the second buffer while available storage capacity of the second buffer decreases.

The decoding of the video signal may comprise reading and decoding the video signal from the second buffer having the decreased available storage capacity when the wireless communication state is determined to be a short-term nontransmissive state.

The determining of the wireless communication state may comprise determining that the wireless communication state is the short-term nontransmissive state if the wireless receiver does not receive the video signal over a predetermined time.

BRIEF DESCRIPTION OF THE DRAWINGS

These and/or other aspects and advantages of the general inventive concept will become apparent and more readily appreciated from the following description of exemplary embodiments, taken in conjunction with the accompanying drawing figures of which:

FIG. 4 is a flowchart illustrating a wireless communication method using a wireless channel according to an embodiment of the present general inventive concept.

DETAILED DESCRIPTION OF THE PREFERRED EMBODIMENTS

Figure 1:
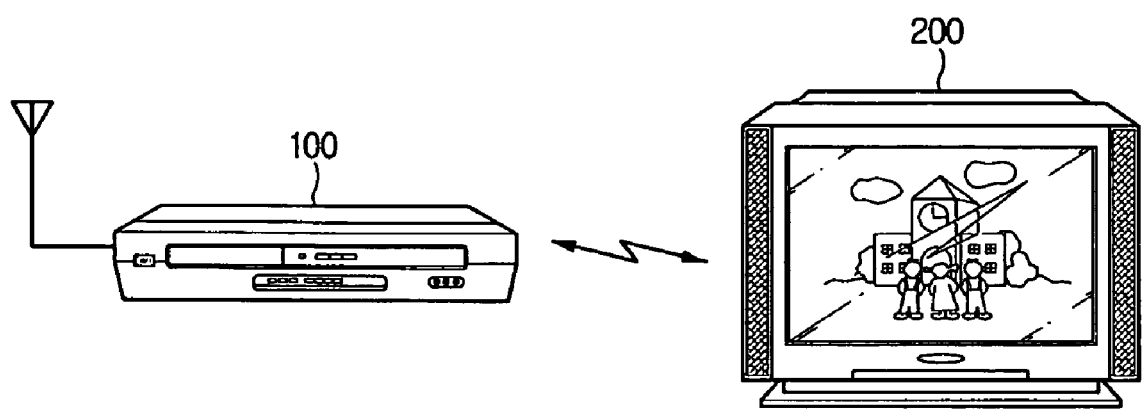
FIG. 1 illustrates a wireless communication system using a wireless channel according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the drawings.

FIG. 1 illustrates a wireless communication system using a wireless channel according to an embodiment of the present general inventive concept.

Referring to FIG. 1, the wireless communication system includes a transmitting device 100 and a receiving device 200. The receiving device 200 may be a digital television. The transmitting device 100 changes one of a data bitrate of a video signal and an actual transmission rate of the video signal according to a determination of a maximum transmission throughput of the wireless channel, and transmits the video signal to the receiving device 200 according to the change in the data bitrate or the change in the actual transmission rate.

The maximum transmission throughput of the wireless channel is a maximum amount of data to be transmitted by the transmitting device 100 across the wireless channel to the receiving device 200 per time. The maximum transmission throughput varies depending on an external environment. The data bitrate determines a coding unit of the video signal, i.e., the amount of space one second of the video signal takes in bits. The actual transmission rate is the rate at which a data bitrate is actually transmitted from the transmitting device 100 to the receiving device 200. The actual transmission rate may be measured in bytes per second (bps).

The receiving device 200 receives, temporarily stores, and decodes the video signal transmitted from the transmitting device 100. The receiving device 200 and the transmitting device 100 transceive the video signal over the wireless channel.

An example of the transmitting device 100 may include a set-top box that processes the video signal incoming from a video source. An example of the receiving device 200 may include a digital television. The video source may include a digital versatile disc player (DVDP), a broadcast station, or the like.

Figure 2:
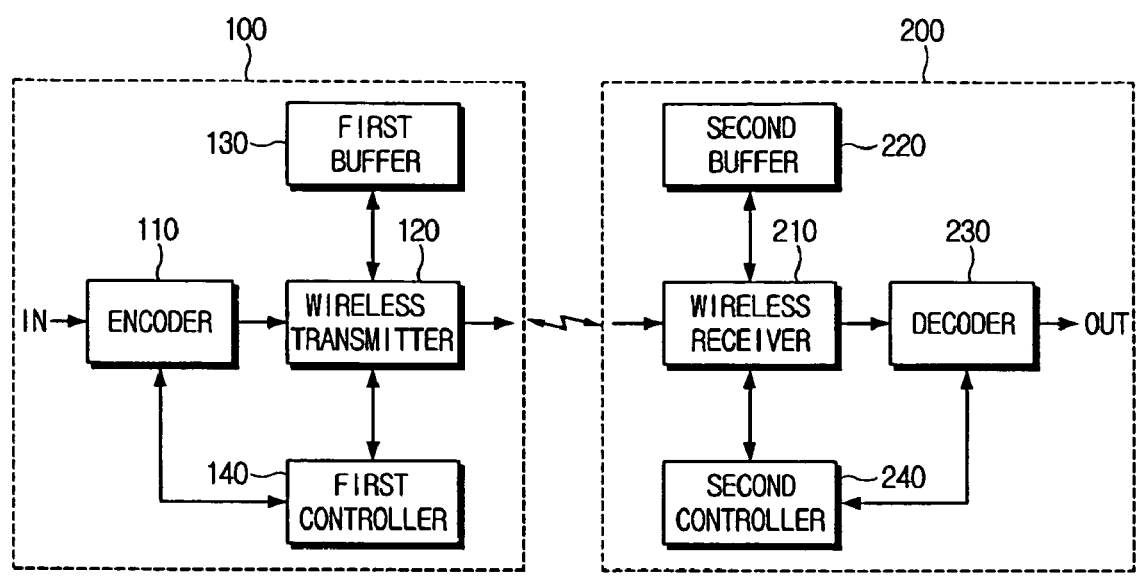
FIG. 2 is a block diagram illustrating a transmitting device and a receiving device of the wireless communication system of FIG. 1.

FIG. 2 is a block diagram illustrating the transmitting device 100 and the receiving device 200 of the wireless communication system of FIG. 1.

Referring to FIGS. 1 and 2, the transmitting device 100 includes an encoder 110, a wireless transmitter 120, a first buffer 130, and a first controller 140.

The encoder 110 encodes an incoming video signal (IN) which varies according to the data bitrate. The encoder 100 may compress the incoming video signal in a compression format such as Motion pictures Experts Group (MPEG). The encoder 110 encodes the video signal with the varying data bitrate under the control of the first controller 140.

The data bitrate is varied depending on a wireless communication state. For instance, in the event that the maximum transmission throughput is greater than the actual transmission rate by a certain value, the encoder 110 encodes the video signal according to a maximum data bitrate. The term "bitrate" refers to an amount of physical space (i.e., storage capacity) one second of the video signal occupies in encoded bits. Thus, the encoder 110 varies the data bitrate by compressing the video signal more or less according to the wireless communication state.

The wireless transmitter 120 provides the encoded video input from the encoder 110 to the first buffer 130.

The wireless transmitter 120 reads the encoded video signal that is temporarily stored in the first buffer 130 according to the actual transmission rate (Mbps), and sends the video signal to the receiving device 200. The wireless transmitter 120 varies the actual transmission rate with which the video signal is transmitted to the receiving device 200 according to the maximum transmission throughput of the wireless channel. The maximum transmission throughput of the wireless channel varies according to the wireless communication state.

The wireless transmitter 120 checks the maximum transmission throughput of the wireless channel, and notifies the first controller 140 of the checked maximum transmission throughput. The maximum transmission throughput of the wireless channel is channel information indicating the wireless communication state as affected by the external environment.

For example, during unusual weather changes such as thunder and lightning, impulse noise is generated to the wireless channel, causing the maximum transmission throughput to abruptly decrease. In this situation, the wireless transmitter 120 checks and notifies the first controller 140 of the decreased maximum transmission throughput.

The first controller 140 controls overall operations of the transmitting device 100 according to a control program stored in a storage (not shown).

According to an embodiment of the present general inventive concept, the first controller 140 determines the wireless communication state based on the maximum transmission throughput checked by the wireless transmitter 120. The first controller 140 controls one of the encoder 110 and the wireless transmitter 120 to change one of the data bitrate and the actual transmission rate, respectively, according to the determination of maximum transmission throughput.

Figure 3:
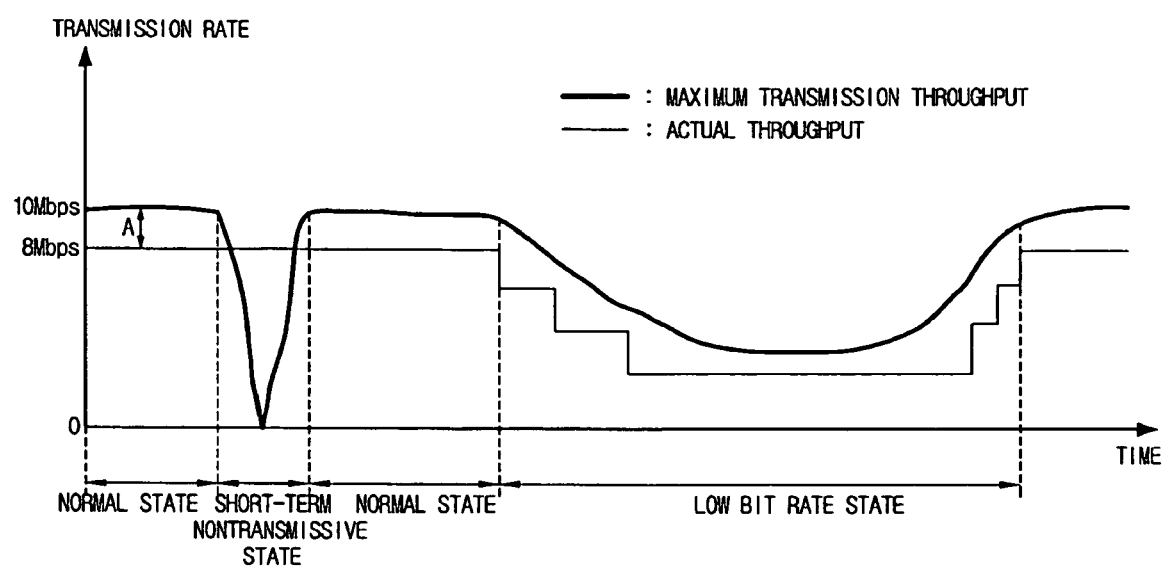
FIG. 3 is a graph of a wireless communication state as determined by a first controller of the transmitting device of FIG. 2.

FIG. 3 illustrates the wireless communication state determined by the first controller 140 of the transmitting device 100 of FIG. 2.

In reference to FIG. 3, the horizontal axis indicates a time, and the vertical axis indicates a transmission rate (bps). The bold line indicates the maximum transmission throughput checked by the wireless transmitter 120, and the thin line indicates the actual transmission rate transmitted from the wireless transmitter 120. For example, 10 Mbps is a maximum value of the maximum transmission throughput, while 8 Mbps may be a maximum value of the actual transmission rate. The wireless communication state may include a normal state, a short-term nontransmissive state, and a low bit rate state. The actual transmission rate and the maximum transmission throughput may be referred to in terms of a "bit rate," which may be understood to refer to a number of encoded data bits that pass a given point (e.g., the wireless channel) per time.

The first controller 140 determines that the wireless communication state is the normal state when the maximum transmission throughput checked by the wireless transmitter 120 is greater than the maximum value (e.g., 8 Mbps) of the actual transmission rate by a predetermined value A.

Upon determining that the wireless communication is in the normal state, the first controller 140 controls the wireless transmitter 120 to increase the actual transmission rate of the video signal temporarily stored in the first buffer 130 to the receiving device 200. In particular, the first controller 140 controls the wireless transmitter 120 to increase the actual transmission rate of the video signal to the maximum value of the maximum transmission throughput (e.g., 10 Mbps) and transmits the video signal to the receiving device 200 at the maximum value of the maximum transmission throughput.

Referring to FIG. 3, if the wireless transmission is in the normal state, the first controller 140 can control the wireless transmitter 120 to increase the actual transmission rate of the video signal being transmitted from 8 Mbps to 10 Mbps.

The first controller 140 determines that the wireless communication state is the low bit rate state when the maximum transmission throughput checked by the wireless transmitter 120 decreases and becomes less than a predetermined threshold value. In the low bit rate state, the first controller 140 controls the encoder 110 to decrease the data bitrate of the video signal. For example, the predetermined threshold value may be the maximum value of the actual transmission rate (e.g., 8 Mbps). Thus, in the low bit rate state the video signal is encoded in a more compressed form than in the normal state so that more of the video signal can be transmitted over the wireless channel per time during the low bit rate state.

Similarly, when the decreased maximum transmission throughput rises, the first controller 140 controls the encoder 110 to increase the data bitrate of the video signal (i.e., the encoded video signal is in a less compressed form). Increases and decreases in the data bitrate are proportional to the increases and decreases in the maximum transmission throughput. As a result of varying the encoding of the data bitrate, a constant amount of video signal can be transmitted over the wireless channel regardless of whether the wireless communication state is in the normal state, the low bit rate state, or even the short-term non-transmissive state.

Referring to FIG. 3, when the wireless communication is in the low bit rate state, the first controller 140 controls the encoder 110 to encode the video signal being encoded at 8 Mbps bitrate with a bitrate that is less than 8 Mbps bitrate. That is, the first controller 140 controls the encoder 110 to encode the video signal at a rate less than 8 Mbps in the low bit rate state.

The first controller 140 determines that the wireless communication state is the short-term nontransmissive state when the maximum transmission throughput checked by the wireless transmitter 120 decreases and increases abruptly within a certain time. In the short-term nontransmissive state, the wireless transmitter 120 cannot send the encoded video signal temporarily stored by the first buffer 130 to the receiving device 200. The phenomenon that the maximum transmission throughput decreases and increases abruptly within a short time occurs, for example, in the event that impulse noise is applied to the wireless channel over which the video signal is transmitted.

Referring back to FIG. 2, the receiving device 200 includes a wireless receiver 210, a second buffer 220, a decoder 230, and a second controller 240.

The wireless receiver 210 receives the video signal from the transmitting device 100 and inputs the received video signal to the second buffer 220. According to an embodiment of the present general inventive concept, in the normal state of the wireless communication, the wireless receiver 210 receives the video signal being transmitted at a transmission rate (e.g., 10 Mbps) that is greater than the maximum value (e.g., 8 Mbps) of the actual transmission rate and inputs the video signal to the second buffer 220. In the normal state the second buffer 220 continuously receives more video signal data than video signal data that is output therefrom and transmitted to the decoder 230. Thus, available storage capacity of the second buffer 220 decreases in the normal state.

The wireless receiver 210 reads the video signal from the second buffer 220 by a certain unit (for example, by 8 Mbps), and provides the read video signal to the decoder 230.

The second buffer 220 temporarily stores the video signal input from the wireless receiver 210.

The decoder 230 decodes the video signal received from the wireless receiver 210. For example, the decoder 230 may decompress the video signal from a format such as a MPEG format.

The second controller 240 controls the wireless receiver 210 and the second buffer 220 to temporarily store the video signal received from the transmitting device 100 in the second buffer 220.

In particular, the second controller 240 controls the wireless receiver 210 and the second buffer 220 to temporarily store in the second buffer 220 the video signal that is transmitted at the actual transmission rate that is equal to the maximum value of the maximum transmission throughput (e.g., 10 Mbps) in the normal state, while the available storage capacity of the second buffer 220 decreases. In other words, since the video signal is transmitted at the actual transmission rate that is equal to the maximum value of the maximum transmission throughput in the normal state, the second controller 240 processes to temporarily store more of the video signal in the second buffer 220 than the video signal that is read by the wireless receiver 210 and provided to the decoder 230.

Upon determining that the wireless communication state is the short-term nontransmissive state, the second controller 240 controls the wireless receiver 210 to read the video signal from the second buffer 220, having the decreased available storage capacity, and to provide the read video signal to the decoder 230. The second controller 240 determines that the wireless communication is in the short-term nontransmissive state when the wireless receiver 210 does not receive the video signal from the transmitting device 100 over a predetermined time.

FIG. 4 is a flowchart illustrating a wireless communication method using the wireless channel of the wireless communication system of FIG. 2.

Referring to FIGS. 1 to 4, the first controller 140 controls the encoder 110, the wireless transmitter 120, and the first buffer 130 to encode the incoming video signal (S405) and to temporarily store the encoded video signal in the first buffer 130 (S410). The first controller 140 controls the encoder 110 to encode the video signal at a certain data bitrate (S405).

The first controller 140 receives a determination of the maximum transmission throughput of the wireless channel checked by the wireless transmitter 120 (S415), and determines the wireless communication state based on the checked maximum transmission throughput (S420).

If the wireless communication state is determined to be the normal state (S425), the first controller 140 controls the wireless transmitter 120 to transmit the video signal, which is temporarily stored in the first buffer 130, to the receiving device 200 according to an increased actual transmission rate (S430).

When the video signal is received from the transmitting device 100 (S430), the second controller 240 of the receiving device 200 controls the wireless receiver 210 and the second buffer 220 to temporarily store the video signal that is transmitted at the increased actual transmission rate in the second buffer 220 (S435). During operation in the normal state, the second controller 240 processes to decrease the available storage capacity of the second buffer 220, that is, to temporarily store a large amount of the video signal in the second buffer 220. The large amount of the video signal is stored to prevent discontinuity of the video signal displayed on a screen in the event that the wireless communication state becomes the short-term nontransmissive state and the maximum transmission throughout abruptly decreases.

Next, the second controller 240 controls the wireless receiver 210 to provide the decoder 230 with the video signal read from the second buffer 220, and controls the decoder 230 to decode the video signal provided from the wireless receiver 210 (S440).

If it is determined that the wireless communication is in the short-term nontransmissive state, the second controller 240 controls the wireless receiver 210, the second buffer 220, and the decoder 230 to decode the video signal (S445 and S450), which is temporarily stored in the second buffer 220 of the decreased available storage capacity of S435. As a result, the video signal is decoded and displayed on the screen without discontinuity. If the wireless receiver 210 does not receive the video signal over a predetermined time, the second controller 240 determines that the wireless communication is in the short-term nontransmissive state.

If it is determined that the wireless communication state is the short-term nontransmissive state according to the determination of S420 (S455), the first controller 140 receives from the wireless transmitter 120 a signal indicating that the transmission of the video signal temporarily stored in the first buffer 130 has failed (S460).

If it is determined that the wireless communication state is the low bit rate state according to the determination of S420 (S465), the first controller 140 controls the encoder 110 to encode the video signal at a data bitrate that is less than the data bitrate of S405 (S470). The first controller 140 may control the data bitrate of the video signal to be proportional to a rate with which the maximum transmission throughput decreases and/or increases.

The first controller 140 controls the actual transmission rate and the data bitrate of the video signal depending on the wireless communication state. Especially, in the normal state, large amount of the video signal is transmitted to the receiving device 200 by increasing the actual transmission rate. In the low bit rate state, the data bitrate is decreased, thus preventing over-encoding of the video signal. In the short-term nontransmissive state, the video signal, which is temporarily stored in the second buffer 220 when the receiver 200 is in the normal state, is decoded, thus preventing the discontinuity of the video signal displayed on the screen.

Thus, the present general inventive concept adjusts an amount of video signal transmitted across the wireless channel according to the wireless communication state. When the wireless communication state is in the normal mode, more of a video signal is transmitted per time. As a result, when the wireless communication state is in the short-term nontransmissive state, more of the video signal is available to be displayed on the display screen, and regardless of the fact that no video signal is actually being transmitted across the wireless channel enough of the video signal can be provided to be continuously displayed on the screen. Additionally, a data bitrate used to encode the video signal may also be varied according to whether the wireless communication state is in the normal state or the low bit rate state to transmit a constant amount of video signal regardless of whether the wireless channel is in the normal state or the low bit rate state.

In light of the foregoing, a wireless communication system and a wireless communication method using a wireless channel, according to various embodiments of the present general inventive concept, addresses the discontinuity of the video signal that may occur during a transmission of a video signal over the wireless channel. Particularly, when a wireless communication state becomes a short-term nontransmissive state due to a sudden change in an external environment, discontinuity of the video signal on the screen of the receiving device can be prevented before hand. This is accomplished by transmitting large amount of the video signal from the transmitting device to the receiving device and storing the large amount of the video signal in the buffer of the receiving device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A wireless communication system using a wireless channel, comprising:
    a first controller to determine a wireless communication state based on the checked maximum transmission throughput and to control the encoder or the wireless transmitter to change the data bitrate or the actual transmission rate, respectively, according to the determination of the wireless communication state;
    a transmitting device to change either a data bitrate of a video signal or an actual transmission rate of the video signal according to a determination of a maximum transmission throughput of the wireless channel, and to transmit the video signal over the wireless channel according to the change in the data bitrate of the video signal or the actual transmission rate of the video signal; and
    a receiving device to receive, temporarily store, and decode the video signal transmitted over the wireless channel,
    wherein the transmitting device transmits the video signal such that the receiving device receives more video signal data than is decoded by the receiving device when the maximum transmission throughput exceeds a predetermined threshold.

2. The wireless communication system of claim 1, wherein the transmitting device comprises:
    an encoder to encode the video signal according to the data bitrate;
    a first buffer to temporarily store the encoded video signal;
    a wireless transmitter to check the maximum transmission throughput which varies according to an external environment and to transmit the temporarily stored video signal to the receiving device over the wireless channel.

3. The wireless communication system of claim 2, wherein the first controller controls the wireless transmitter to transmit the video signal to the receiving device by increasing the actual transmission rate of the video signal temporarily stored in the first buffer if the wireless communication state is determined to be a normal state.

4. The wireless communication system of claim 3, wherein the first controller controls the wireless transmitter to transmit the video signal by increasing the actual transmission rate to a maximum value of the maximum transmission throughput.

5. The wireless communication system of claim 3, wherein the first controller determines that the wireless communication state is the normal state if the maximum transmission throughput is greater than a maximum value of the actual transmission rate by a certain value.

6. The wireless communication system of claim 2, wherein the first controller controls the encoder to decrease the data bitrate of the video signal when the wireless communication state is determined to be a low bit rate state in which the maximum transmission throughput is less than a predetermined threshold.

7. The wireless communication system of claim 6, wherein the predetermined threshold is the maximum value of the actual transmission rate.

8. The wireless communication system of claim 3, wherein the receiving device comprises:
    a wireless receiver to receive the video signal transmitted from the transmitting device;
    a second buffer to temporarily store the received video signal;
    a decoder to decode the stored video signal; and
    a second controller to control the wireless receiver and the second buffer to temporarily store the received video signal in the second buffer.

9. The wireless communication system of claim 8, wherein the second controller controls the wireless receiver and the second buffer to temporarily store the video signal being transmitted at the increased actual transmission rate in the normal state in the second buffer while available storage capacity of the second buffer decreases.

10. The wireless communication system of claim 9, wherein the second controller controls the wireless receiver to read the video signal from the second buffer having the decreased available storage capacity and provide the read video signal to the decoder if the wireless communication state is determined to be a short-term nontransmissive state.

11. The wireless communication system of claim 10, wherein the second controller determines that the wireless communication state is the short-term nontransmissive state if the wireless receiver does not receive the video signal over a predetermined time.

12. The wireless communication system of claim 1, wherein the transmitting device comprises a set-top box receiving the video signal from a video source, and the receiving device comprises a television reproducing the video signal received from the transmitting device.

13. A method of maintaining a continuous signal output in a wireless communication system having a discontinuous wireless channel, the method comprising:
    determining a wireless communication state based on the checked maximum transmission throughput and to control the encoder or the wireless transmitter to change the data bitrate or the actual transmission rate, respectively, according to the determination of the wireless communication state;
    transmitting an excess amount of signal data across the wireless channel and storing the excess amount of signal data in a receiving device when the wireless channel is operating properly; and
    continuously outputting the signal data from the receiving device when the wireless channel is not operational.

14. The method of claim 13, further comprising:
    storing the excess amount of signal data at the receiving device of the wireless channel.

15. The method of claim 13, further comprising:
    when the wireless channel is operating properly, varying an encoding data bitrate according to changes in a maximum throughput of the wireless channel so that a constant amount of signal data is transmitted across the wireless channel regardless of the maximum throughput of the wireless channel.

16. A wireless communication method using a wireless channel, the method comprising:

changing one of a data bitrate of a video signal and an actual transmission rate of the video signal based on a determination of a maximum transmission throughput of the wireless channel, and transmitting the video signal over the wireless channel according to the change in the bitrate or the change in the actual transmission rate; and receiving, temporarily storing, and decoding the video signal transmitted over the wireless channel such that the amount of video signal data received is greater than the amount of video signal data decoded when the maximum transmission throughput exceeds a predetermined threshold.

17. The wireless communication method of claim 16, wherein the transmitting of the video signal over the wireless channel comprises:

encoding the video signal according to the data bitrate;
temporarily storing the encoded video signal in a first buffer;
measuring the maximum transmission throughput, which varies according to an external environment;
determining a wireless communication state based on the measured maximum transmission throughput; and
transmitting the video signal by increasing the actual transmission rate of the video signal temporarily stored in the first buffer if the wireless communication state is determined to be a normal state.

18. The wireless communication method of claim 17, wherein the transmitting of the video signal by increasing the actual transmission rate comprises transmitting the video signal to the receiving device by increasing the actual transmission rate of the video signal to a maximum value of the maximum transmission throughput if the wireless communication state is determined to be the normal state.

19. The wireless communication method of claim 17, wherein the determining of the wireless communication state comprises determining that the wireless communication state is the normal state if the maximum transmission throughput is greater than a maximum value of the actual transmission rate by a certain value.

20. The wireless communication method of claim 17, wherein the encoding of the video signal comprises decreasing the data bitrate of the video signal when the wireless communication state is determined to be a low bit rate state in which the maximum transmission throughput is less than a predetermined threshold.

21. The wireless communication method of claim 20, wherein the predetermined threshold is the maximum value of the actual transmission rate.

22. The wireless communication method of claim 17, wherein the receiving of the video signal comprises:

receiving the transmitted video signal;
temporarily storing the received video signal in a second buffer; and
decoding the video signal temporarily stored in the second buffer.

23. The wireless communication method of claim 22, wherein the temporary storing of the received video signal in the second buffer comprises temporarily storing the video signal being transmitted at the increased actual transmission rate in the normal state in the second buffer while available storage capacity of the second buffer decreases.

24. The wireless communication method of claim 23, wherein the decoding of the video signal comprises reading and decoding the video signal from the second buffer having the decreased available storage capacity when the wireless communication state is determined to be a short-term nontransmissive state.

25. The wireless communication method of claim 24, wherein the determining of the wireless communication state comprises determining that the wireless communication state is the short-term nontransmissive state if the wireless receiver does not receive the video signal over a predetermined time.

* * * * *